Aug. 22, 1944.        W. KOEPPE ET AL        2,356,593
LIQUID OPERATED ELECTRIC CONTROL DEVICE
Filed April 24, 1940

Inventors.
WALTER KOEPPE
GUSTAV KODAL
By *Holcombe*
Attorney.

Patented Aug. 22, 1944

2,356,593

UNITED STATES PATENT OFFICE 2,356,593

LIQUID OPERATED ELECTRIC CONTROL DEVICE

Walter Koeppe, Berlin-Spandau, and Gustav Kodal, Berlin-Siemensstadt, Germany; vested in the Alien Property Custodian Application April 24, 1940, Serial No. 331,408
In Germany March 22, 1939

14 Claims. (Cl. 73—304)

This invention relates to a liquid operated electric control device particularly adapted to measure or tele-indicate liquid levels as, for instance, to indicate the residual amount of liquid contained in an airplane tank.

To indicate liquid levels, and particularly to tele-indicate liquid levels, floats have hitherto been employed which depending upon their position actuate various electric contacts; or the indication was based upon the measurement of a capacity between two electrodes immersed in the liquid which varies with varying liquid level. Furthermore, it is well known in the art to base the indication of liquid levels upon the measurement of an ohmic resistance immersed in the liquid and whose magnitude depends upon the liquid level.

By the electric control device according to the invention it is possible to measure the liquid level in a particularly simple and reliable manner. The novel liquid operated electric control device for measuring liquid levels is characterized by the fact that the surface tension of the liquid serves to operate the electric control device. The electric control device according to the invention consists of at least two parts having surfaces which are movable with respect to each other and which are so arranged that they change their position with respect to each other under the action of the surface tension of the liquid, thereby influencing an electric circuit. The two parts may consist, for instance, of a stationary part and a sheet of flexible metal foil. In this instance the metal foil comes into engagement with the surface of the stationary part under the action of the surface tension of the liquid when the parts emerge from the liquid. Of course, it is also possible to design both parts so as to be movable with respect to each other; as, for example, in the form of foils or sets of foils which when immersed in the liquid do not touch each other, whereas when they emerge from the liquid they come into engagement under the action of the surface tension of the liquid adhering to the same.

Finally, it is also possible according to the invention to cause the control device to act as a servomotor, i. e., by causing the one part when taking measurements to be set in motion, preferably in rotation. If this part is, for instance, designed as a revolving cylinder and the other part as a ribbon-shaped foil loosely surrounding wholly or in part the cylinder, this foil will not adhere to the cylinder when immersed in the liquid, whereas it does when it emerges from the liquid, thus producing in the tangential direction of the revolving cylinder a pulling force on one part secured to the foil.

In some cases it may be preferable to provide the novel control device with a further stationary part with respect to which at least one of the other two parts movable with respect to each other changes its position upon actuation of the control device, thereby influencing the above-mentioned electric circuit or at the same time a further electric circuit. In this case this part must, however, be so designed that no appreciable effect of the surface tension occurs between that part and the part movable with respect thereto. Such a control device may as hereinafter described serve, for instance, as a multiple-way switch.

Here the two parts movable with respect to each other, i. e. foil and surface, come into engagement with each other in the case of wetting liquids when emerging from the liquid, whereas if nonwetting liquids are employed the parts are in engagement with each other in the liquid and come out of engagement when they emerge from the liquid.

When using wetting liquids the parts of a control device not immersed in the liquid remain in contact with each other till the liquid adhering thereto evaporates. To prevent a subsequent separation of the parts a protection against evaporation may be provided according to the invention which supplies fresh liquid to the control device upon the evaporation of the liquid adhering to the control device not in contact with the liquid. Such a protection against evaporation may be carried out in different ways; for instance, by using a hygroscopic material for one part of the control device, a portion of the material being always in contact with the liquid, or by arranging one or more grooves in one part of the control device whose ends are immersed in the liquid and in which the liquid rises by reason of the capillary effect or also by using a wick which brings the control device into contact with the liquid.

The control device may be caused to act in various ways on the electric circuit of which it forms, as a rule, one part. Thus, it is possible to design the control device in such a manner that when actuated it closes an electric contact. In this case one or both of the parts movable with respect to each other may be designed in the form of contacts or one part may actuate a contact by utilizing the effect of the control device operating as a servomotor. Furthermore, the control device may be employed to vary the capacity of a condenser, in which case the parts movable with respect to each other may serve as coatings for the condenser. In this case by actuating the control device sudden changes in capacity are attained which may be measured with the aid of relatively simple means.

Finally, by the use of the control device it is also possible to vary the value of an inductance, for instance, by the fact that the movable part is made of magnetic material and is so arranged in relation to the coil that changes in the position of the movable part bring about changes in the inductance.

Such a control device may be used for many purposes. As already mentioned it may be employed to indicate a liquid level upon the attainment of a predetermined height or to cause a signal to be transmitted upon the attainment of a predetermined height. Thus, for instance, in the event that the residual amount of liquid contained in an airplane tank is to be indicated, the control device may be installed on the bottom of the tank to be supervised, and is actuated as soon as the liquid level lowers below a predetermined height. The control device may also be employed to indicate a predetermined maximum value of the liquid level.

By arranging only two control devices closely one above the other it is possible to regulate in a simple manner the liquid level to a constant value, i. e. by interrupting or reducing the flow of liquid upon the actuation of the upper control device or by initiating or increasing the flow of liquid upon the actuation of the lower control device.

Two or more control devices according to the invention arranged one above the other may serve as a liquid level indicator and it is possible to easily carry out remote measurements with the aid of the same. However, their use is not limited to the indication or remote measurement of liquid levels, such as the depth of a river or the liquid level in a tank, but they may be used to measure other conditions, such as temperature, pressure or the like.

In principle it is immaterial whether the liquid operating the control device is the same or differs from that to be supervised or controlled. In many cases it is preferable to use as the operating liquid another liquid than that whose level is to be supervised; for instance, when measuring the depth of a river, since the control devices are exposed to a contamination by the foreign substances contained in the water. In this case a liquid is employed which avoids the above drawbacks and which does not intermix with the liquid whose level is to be supervised. However, as a rule, all kinds of liquids may be employed irrespective of whether they are conductive or nonconductive. In the dissociating liquids care should only be taken to see that the current carrying parts placed in the liquid conduct only alternating current and no direct current.

The control device may be employed for purposes other than the above mentioned, i. e., for the indication and the remote measurement of the dew point, since it operates at the moment at which its movable parts are wet by the dew.

In the drawing which shows diagrammatically several embodiments of my invention:

Figure 1:
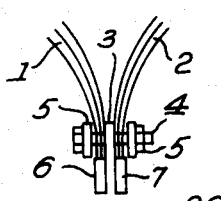
Fig. 1 is a view of one embodiment of the invention.

The electric control device as shown in Fig. 1 is provided with two sets of foils 1 and 2 movable with respect to each other, electrically insulated from one another by an insulating piece 3 and pressed together by a bolt 4 and a clamping piece 5, 6 and 7 are connections for the sets of foils.

If such a control device emerges from the liquid, in which case the liquid level is to be considered as being parallel to the plane of the drawing, the sets of foils come into engagement with one another, thereby influencing an electric circuit connected to the connections 6 and 7. In this case the two inner foils may serve as contacts, or as coatings of a condenser provided that as thin an insulating layer as possible is arranged on one or both foils.

Figure 2:
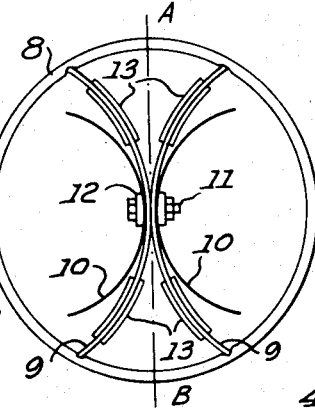
Fig. 2 is a view similar to Fig. 1 showing another embodiment of the invention.

In Fig. 2 is shown a top view of the control device consisting of two control elements arranged symmetrically with respect to the axis A—B within the ring 8. Each control element is provided with a bent stationary surface 9 forming one of the parts movable with respect to each other and to which a metal foil 10 which is somewhat more bent is insulatedly secured by means of a screw with a nut 11 and a clamping piece 12. The less bent stationary surface is provided with metal coatings 13 connected to one pole of the electric circuit in which is inserted the control device, whereas the other pole is connected to the metal foil. These coatings may as mentioned above serve as contacts or as the plates of a condenser.

Figure 3:
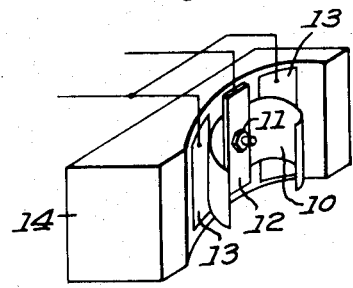
Fig. 3 is a perspective view of another embodiment of the invention.

Fig. 3 is a perspective view of a similarly designed control device. Here the less bent stationary surface is formed by the curved portion of a molded piece consisting of insulating material. 10 denotes the metal foil, 11 and 12 the parts serving to secure it to the molded piece 14, 13 are the metal coatings arranged on the curved portion of the molded piece 14.

Figure 4:
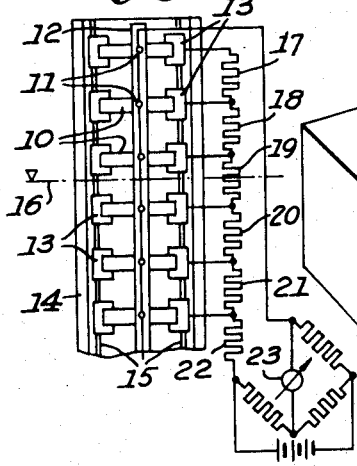
Fig. 4 is a wiring diagram showing some of the elements schematically of an embodiment of the invention similar to that of Fig. 3.

This control device differs from that shown in Fig. 2 only in certain constructional details and is so designed as to form an essential part of a liquid level indicator, such as shown, for instance, in Fig. 4 which is a lateral view thereof. In this case the molded piece 14 is extended by such an amount that the desired number of control devices may be arranged on the extended curved portion thereof. In this case, the metal foils 10 of the control devices may be secured by means of a through clamping bar 12 so that the construction of such a liquid level indicator is very simple. The metal coatings on the molded piece 14 are denoted by the numeral 13 and 11 designates the screws for fastening the clamping bar 12.

To attain an effective protection against evaporation, the curved portion of the molded piece is provided as shown in Fig. 4 with narrow grooves arranged at both sides of the clamping bar and serving to keep the control devices continuously in a moist state when not immersed in the liquid. The parts 13 should be of porous material so that the moisture may reach the surfaces thereof which cooperate with the parts 10.

In Fig. 4 is shown also a bridge connection which may be employed to indicate the liquid level. As shown the adjacent coatings are connected with one another through resistances 17 to 22 arranged in series. The free end of the resistance 22 leads to one diagonal point of the Wheatstone bridge, whereas another diagonal point is connected to the clamping bar 12 which electrically connects the metal foils with one another. As will be seen from Fig. 4, the resistances 17 and 18 not connected to the control devices and lying above the liquid level 16 are always short circuited so that in the branch of the Wheatstone bridge only the resistances 19 to 22 are effective which are connected to the control devices immersed in the liquid. The instrument 23 inserted in the bridge diagonal will always effect a deflection whose magnitude is a measure for the height of the liquid level.

Figure 5:
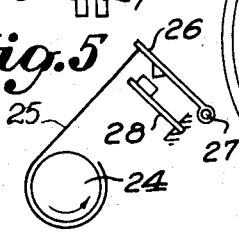
Fig. 5 is a partially schematic view of another embodiment of the invention.

Another embodiment of a control device according to the invention which may be so designed as to act as a servomotor is shown in Fig. 5. 24 is a rod rotating in the direction as indicated by the arrow. Around the rod is arranged a foil 25, one end of which is free and the other end thereof is secured to the contact arm 26 pivotally mounted as indicated at 27. 28 is a stationary contact arm. To measure the liquid level the rod 24 is set in rotation. If in this case the control device is not immersed in the liquid the foil will firmly adhere to the rod in the event of a wetting liquid being present between the foil and the rod so that the contact of the movable arm 26 is brought into engagement with the counter contact. If, however, the control device is immersed in the liquid the contacts are out of engagement with one another.

It is, of course, also possible to cause the rod to rotate continuously so that the contacts of the control device which lie above the liquid level are always closed. However, it is also possible if single measurements are to be carried out at spaced intervals to cause the rod to rotate momentarily so that at the interval between two measurements all contacts are open.

Figure 6:
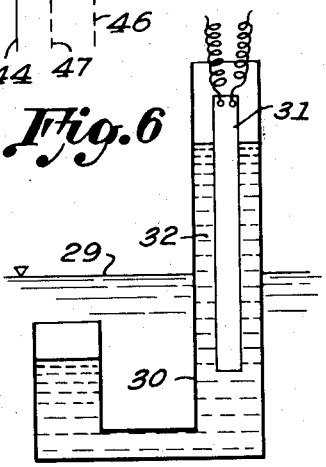
Figs. 6 and 7 are schematic showings of two similar embodiments of the invention used to measure liquid level and gas pressure respectively.

In some cases, particularly when measuring the depth of a river or of the sea it may be desirable as already mentioned above to cause the liquid whose level is to be indicated not to act directly on the control device. In this case, an arrangement may be employed as shown diagrammatically in Fig. 6. 29 indicates, for instance, the fluctuating level of a river. 30 denotes a vessel with communicating tubes immersed in the river. In the longer tube is placed a liquid level indicator 31 consisting of the control devices according to the invention and surrounded by a lighter liquid 32 which preferably does not mix with the river water.

Figure 7:
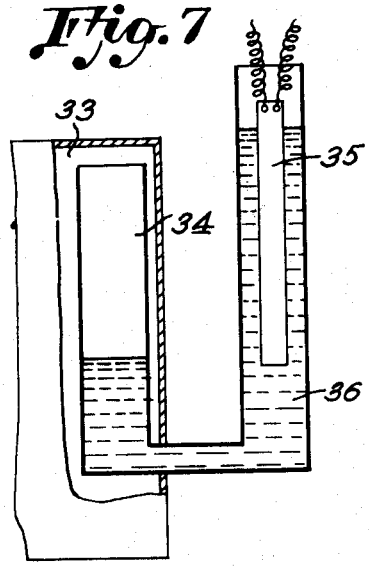

A similar arrangement may be employed if a different physical magnitude, for instance, the pressure of a gas in the chamber 33 of Fig. 7 is to be measured. By means of the arrangement shown in Fig. 7 the super-atmospheric pressure of this gas is measured. One of the communicating tubes 34 of a vessel in which is arranged the control device 35 immersed in the liquid 36 extends within the space 33 and is sealed at the point where it enters the vessel. The operation of this arrangement is similar to the operation of the arrangement shown in Fig. 6 and will not require any further explanation.

Figure 8:
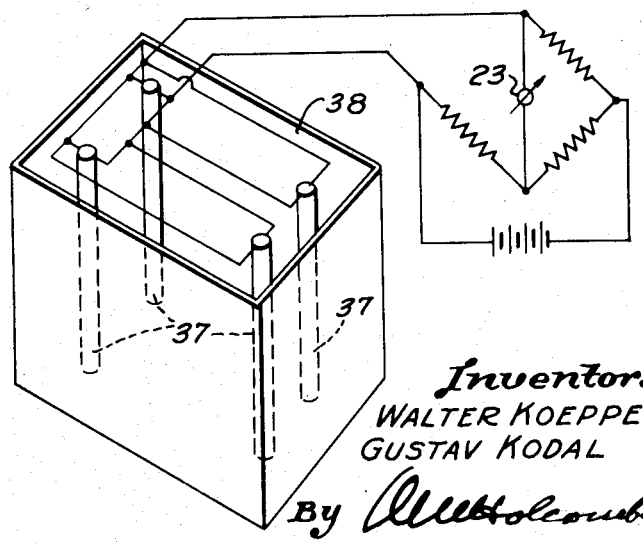
Fig. 8 is a schematic showing of an embodiment of the invention.

If the liquid level in tanks whose position changes is to be measured, faulty measurements may result if only one level indicator is employed. To avoid such faulty measurements, two or more control devices or liquid level indicators are provided according to the invention, such as, for instance, is schematically shown in Fig. 8 for four liquid level indicators 37. In this case the indicators are electrically connected in parallel relation and they are so arranged that upon fluctuations of the liquid level as many control devices of one liquid level indicator are, for instance, closed as control devices are opened on the other two indicators. In this manner the indication of the liquid level within the tank 38 is independent of its position.

Figure 9:
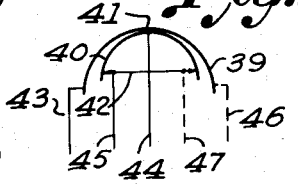
Fig. 9 is a schematic showing of another embodiment of the invention.

As already described above, the control device according to the invention may also be provided with a further stationary part with respect to which the position, for instance, of the metal foil 10 (Fig. 2) varies upon the operation of the control device and which may serve, for instance, as a multiple-way switch. Such a control device is schematically shown in Fig. 9. 39 denotes the stationary surface against which the foil 40 is pressed under the surface tension when the control device emerges from the liquid, the surface 39 and the foil 40 being electrically insulated from each other by an insulation 41. When the control device is submerged in a wetting liquid the effect of the surface tension ceases and the ends of the foil come then into engagement with the other stationary part 42, the foil being made of resilient material and being tensioned against the part 42. In this case it is essential that the surface of the part 42 which the foil engages be small with respect to the surface of the part 39 on which the foil is firmly held by the surface tension, since otherwise it may happen that the foil firmly adheres to the part 42 owing to the surface tension.

The control device operates as a multiple-way switch if, as shown in the Fig. 9, the elements 39, 40 and 42 are connected to the conductors 43 to 45. However, the conductors 44 and 45 only may be connected; or the part 42 and/or the part 39 may be electrically subdivided and additional conductors 46 and 47 may be provided as is shown by the dotted lines in Fig. 9.

This control device need not, of course, be designed in the form of an electric switch as just described but may be employed to vary an inductance or the capacity of a condenser.

Figure 10:
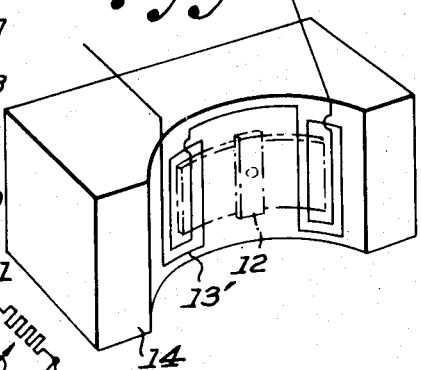
Fig. 10 shows a modification of the structure of Fig. 3 wherein in place of electrical contacts a variable inductance is shown.

In Fig. 10 we insert flat inductance coils 13' in the concave face of the block 14, these coils being connected in series. The inductance of these coils is adapted to be increased by approach of the outer portions of the flexible foil which is also of magnetic material.

What is claimed is:

1. An electrical control device comprising two parts one of which is responsive to the influence of surface tension so that the parts are movable relative to each other under the influence of surface tension of a liquid, and means including said parts for altering an electrical circuit responsive to relative movement thereof.

2. An electrical control device comprising two parts insulated from each other and movable with respect to each other in response to the action of surface tension so that the two parts are separated when the device is immersed in a liquid which wets the parts and which are brought together by the surface tension of the liquid when the parts are no longer completely immersed therein, said parts being of conducting material.

3. An electrical control device comprising two parts insulated from each other and adapted for inclusion in an electrical circuit, said parts having surfaces acted on by the surface tension of a liquid to effect relative movement of said parts to control said circuit.

4. An electrical control device comprising two parts insulated from each other and adapted for inclusion in an electrical circuit, said parts having surfaces acted on by the surface tension of a liquid to bring said surfaces into engagement to close said circuit.

5. An electrical control device for detecting a change in the level of a liquid, said device being located a predetermined distance from the surface of said liquid, and actuating means in said device comprising two coacting surfaces insulated from each other and relatively movable under the influence of surface tension when the liquid level changes enough so that the surface of the liquid is intersected by said surfaces.

6. An electrical control device comprising two parts, said parts having surfaces insulated from each other which are separated when the device is immersed in a liquid and which are brought together by the surface tension of the liquid when they intersect the surface of such liquid, and means for maintaining said surfaces wet with the liquid when they are above the surface of the liquid in order to prevent loss of the surface tension by evaporation of the liquid from said surfaces.

7. An electrical control device comprising a sheet of resilient metallic foil, a body having a surface substantially coextensive with the surface of said foil, means insulating said body and said foil from each other and for supporting them with said surfaces in spaced relation, a second body having a relatively small surface in contact with said foil, said foil being movable under the influence of the surface tension of a liquid when the device is partially immersed therein to break contact with said second body and make contact with said first body.

8. An electrical control device comprising a rotatable cylinder, a strip of resilient metallic sheet material partly enclosing said cylinder, said strip being normally out of contact with said cylinder but adapted to contact the same when the parts are subjected to the surface tension of a liquid, and a pair of contacts actuated by movement of said strip responsive to rotation of said cylinder when the strip is in contact therewith.

9. An electrical control device comprising a movable surface, a strip of resilient material normally spaced away from said surface but adapted to engage the same when the parts are subjected to the surface tension of a liquid, whereby the movement of said surface is communicated to said strip, and an electrical contact controlled by movement of said strip.

10. An electrical control device comprising two parts at least one of which is a sheet of resilient metal foil, means for insulating said parts from each other and for supporting them in spaced relation, whereby the sheet of foil is adapted to be pulled into contact with the other part by the surface tension of a liquid when the parts intersect the surface of such liquid.

11. A liquid level indicator comprising a plurality of control devices arranged in superimposed relation in a liquid container, each control device including circuit controlling means actuated by the surface tension of the liquid, an indicator, and circuit connections including said devices and a source of current for controlling said indicator in accordance with the number of said devices which are below the surface of the liquid in the container.

12. A liquid level indicator comprising a plurality of control devices arranged in superimposed relation in a liquid container, each device including circuit controlling means actuated by the surface tension of the liquid, means for maintaining communication between the liquid and all those devices which are above the level thereof so as to subject such devices to surface tension whether they intersect the surface of the liquid or not, an indicator, and circuit connections including said devices and a source of current for controlling said indicator in accordance with the number of said devices which are subjected to the surface tension of the liquid.

13. A device as described in claim 5 wherein one of said two co-acting surfaces is on a movable part formed of magnetic material, and said device includes a coil, the inductance of which changes in accordance with the position of said movable part.

14. An electrical control device comprising two parts movable with respect to each other and having surfaces acted on by the surface tension of a liquid to bring the surfaces into substantial contact when the surface tension is affected, said parts being normally so positioned that said surfaces are out of contact when not subject to the influences of surface tension, one of said parts being of magnetic material and the other of said parts carrying a coil the inductance of which changes in accordance with the relative position of the two parts.

WALTER KOEPPE.
GUSTAV KODAL.